No. 894,035. PATENTED JULY 21, 1908.
H. MUELLER.
WATER STRAINER.
APPLICATION FILED JUNE 4, 1906.
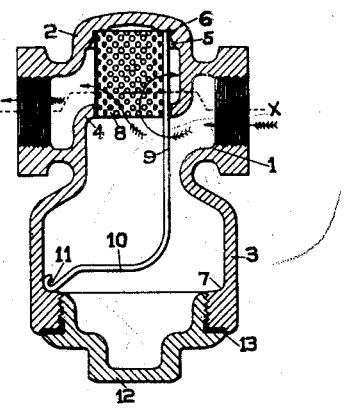
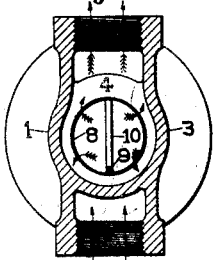
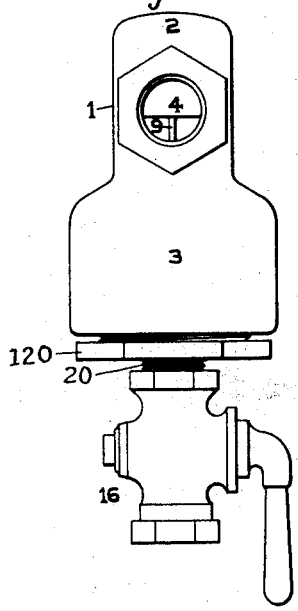
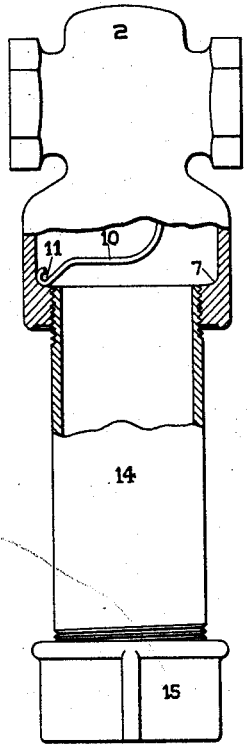
Witnesses
Chester W. Hathaway.
Theodore H. Ackerman.
Inventor
Henry Mueller
by John L. Waddell
his attorney.

UNITED STATES PATENT OFFICE.

HENRY MUELLER, OF DECATUR, ILLINOIS, ASSIGNOR TO H. MUELLER MANUFACTURING COMPANY, OF DECATUR, ILLINOIS, A CORPORATION OF ILLINOIS.

WATER-STRAINER.

No. 894,035.     Specification of Letters Patent.     Patented July 21, 1908.

Application filed June 4, 1906. Serial No. 320,217.

*To all whom it may concern:*

Be it known that I, HENRY MUELLER, a resident of the city of Decatur, county of Macon, and State of Illinois, have invented an Improved Water-Strainer, of which the following is a specification.

This invention relates to water purification, and more especially to that class of devices known as filters of the strainer type; and the object of the same is to produce improvements in a strainer of this character.

To this end the invention consists in the use of a tubular screen within a casing specially shaped for its accommodation and having a distinct sediment chamber entirely below the screen and out of the path of the flowing liquid.

The invention also consists in the use of a resilient rod for holding the screen in place, which rod is removably supported entirely by the casing so that the closure for the latter can be opened without dislodging the rod.

The invention also comprises details of construction as set forth below—all as shown in the accompanying drawings forming a part of this specification, and in which—

Figure 1 is a central vertical section through the strainer complete. Fig. 2 is an end elevation of the strainer with a cock attached thereto. Fig. 3 is a horizontal section on the line X in Fig. 1. Fig. 4 is a side elevation, partly in section, showing an extension attached to the lower end of the casing so as to produce an enlarged sediment chamber.

The casing or body of this strainer is preferably a casting having a dome shaped closed upper end 2, lateral inlet and outlet openings just below it producing a cross passage 1, an integral partition 4 extending from the lower side of the outlet opening to the upper side of the inlet opening and preferably shaped so that its central portion—which is perforated for the passage of the liquid—shall stand horizontal and on a line about opposite the vertical centers of said openings, and a depending integral shell forming a decided sediment chamber 3 concentric with but considerably larger than the perforation through said partition and open and preferably interiorly threaded at its lower end. Said end is closed by any suitable form of closure. In Fig. 1 this is shown as a screw plug 12 cupped interiorly, and a gasket 13 may be employed to make the joint tight. In Fig. 2 a reducer 120 is employed, and to its threaded shank 20 is attached a cock 16. In Fig. 4 a tubular extension 14 of large bore is connected with the lower end of the casing so as to elongate the sediment chamber 3, and lower end of the extension is closed by a cap 15. In any event a distinct sediment chamber is produced which stands entirely below the partition and the screen to be described hereinafter, and also entirely below the path of the liquid flowing through the strainer and therefore out of its current.

Within the upper end 2 of the casing is formed an annular seat 6 concentric with and of the same diameter as the opening through the partition, and the inner wall of the body tapers upward as at 5 to this seat. Surrounding the open lower end of the casing and preferably just above its threads if used, is an interior annular shoulder 7. By preference the entire casing is formed of one casting, and the closure of a separate piece or pieces.

The strainer proper comprises a screen 8 which is cylindrical and tubular, being open at both ends, and perforations are formed through the wall of this screen of such size and number as to aggregate two or three times the capacity of the pipes (not shown) which are connected with the inlet and outlet openings. This screen is of a diameter to closely but removably fit the seat 6 and the perforation in the partition, and of a length to reach from the former to the bottom of the latter and stand flush therewith when in place so as to not interrupt the current flowing through the strainer nor cause unnecessary eddies therein. This screen is preferably made by bending a strip of sheet metal into the form of a cylinder, and securing the conjoined ends, as by solder. In doing so, one end of a resilient rod 9 is united by the solder to the inner face of the screen wall so as not to interrupt its cylindrical exterior but rather to strengthen the junction between said ends. The rod extends parallel with the axis, from the upper end of the screen, downward through and beyond it into the sediment chamber as shown in Fig. 1, and is bent at its lower end into a lateral extension 10 which preferably stands beneath the diameter of the screen and has its extremity deflected downward and rounded as at 11. This construction of the rod permits it to have considerable length so that its upright portion may be deflected laterally and its extension may be deflected vertically in putting the screen into place or removing it.

The liquid entering the inlet at the right of Fig. 1, first fills the sediment chamber and then rises into the screen, flowing through the perforations in the latter and out the outlet as indicated by the arrows. If the volume of liquid is small it may rise only partly into the screen and will pass through the openings at the lower portion thereof, but as the volume and pressure increase the liquid will rise higher therein and more of the perforations will come into play—yet there is no possible way for any liquid to reach the outlet without passing through some portion of the screen. Meanwhile it will be observed that the construction and arrangement of parts afford the least possible obstruction to the current of the liquid which might undesirably cause eddies therein, and for this reason particles of foreign matter that may be carried into the strainer with the liquid are permitted to settle within the sediment chamber and accumulate at its lower end. Particularly when the flow is cut off, even the lightest particles which may have accumulated within the screen will detach themselves therefrom and settle within the sediment chamber. If the latter is voided frequently it can be done by opening the cock 16 and permitting the pressure to blow out the sediment. In some instances where this strainer will not receive attention save at long periods, it may be desirable to employ the extension 14 or one of greater length so as to materially increase the capacity of the sediment chamber. From time to time the interior of the strainer can be cleaned by removing the closure whatever its form. To withdraw the screen the extension 10 is grasped by hand and the rod 9 deflected so that the extremity 11 is removed from the shoulder 7, when the screen and rod can be drawn out of position. This action is reversed in order to replace the screen, the latter being pushed upward through the perforation in the partition so that its upper end strikes the incline 5 and is guided to the seat 6, after which the screen will retain its position while the rod is sprung so as to engage its extremity 11 with the shoulder 7 as shown.

What is claimed as new is:

1. A liquid strainer comprising an upright casing having a cross passage near its upper end interrupted by a partition having an upright perforation and forming a distinct sediment chamber beneath it, an annular seat within the top of the casing concentric with and of the same size as said perforation, the inner wall of the casing being tapered to said seat, and a closure for the lower end of the casing; combined with a tubular screen of a size to removably fit said perforation and seat and of a length to reach from the latter through the former and stand flush with the lower face of the partition, and means for holding the screen removably in place.

2. A liquid strainer comprising an upright casing having a cross passage near its upper end interrupted by a partition having an upright perforation and forming a distinct sediment chamber beneath it, an annular seat within the top of the casing concentric with and of the same size as said perforation, and a closure for the lower end of the casing; combined with a tubular screen of a size to removably fit said perforation and seat, and a resilient rod secured within the screen and removably engaging the interior of said chamber for holding the screen in place.

3. A liquid strainer comprising an upright casing having a cross passage near its upper end interrupted by a partition having an upright perforation and forming a distinct sediment chamber beneath it, an annular seat within the top of the casing concentric with said perforation, an interior shoulder within the sediment chamber, and a closure for the end of the casing; combined with a tubular screen of a size to removably fit said perforation and seat, a resilient rod secured within the screen and extending into said chamber, and a lateral extension at its lower end to removably engage said shoulder.

4. A liquid strainer comprising an upright casing having a cross passage near its upper end interrupted by a partition having an upright perforation and forming a distinct sediment chamber beneath it, an interior shoulder within the sediment chamber, and a closure for the lower end of the casing; combined with a tubular screen of a size to removably fit said perforation, a resilient rod secured within the screen parallel with its axis and extending from its upper extremity through its body and into said chamber, and a lateral extension at its lower end standing beneath the diameter of said screen and deflected and rounded at its extremity, to removably engage said shoulder.

5. In a liquid strainer, the combination with an upright casing having a cross passage interrupted by a perforated partition and an open lower end surrounded by an interior shoulder, and an extension removably connected with said lower end and normally closed at its lower extremity to constitute an elongated sediment chamber; of a tubular screen removably fitting within said perforation and against the top of the casing, and a yielding support therefor detachably engaging said shoulder and accessible when the extension is removed.

In testimony whereof I sign my name in the presence of two subscribing witnesses.

HENRY MUELLER.

Witnesses:
HARRIETT MAJOR,
JOHN L. WADDELL.